Dec. 30, 1958 M. J. FLETCHER ET AL 2,866,267
DENTAL HAND DRILL
Filed Feb. 10, 1958
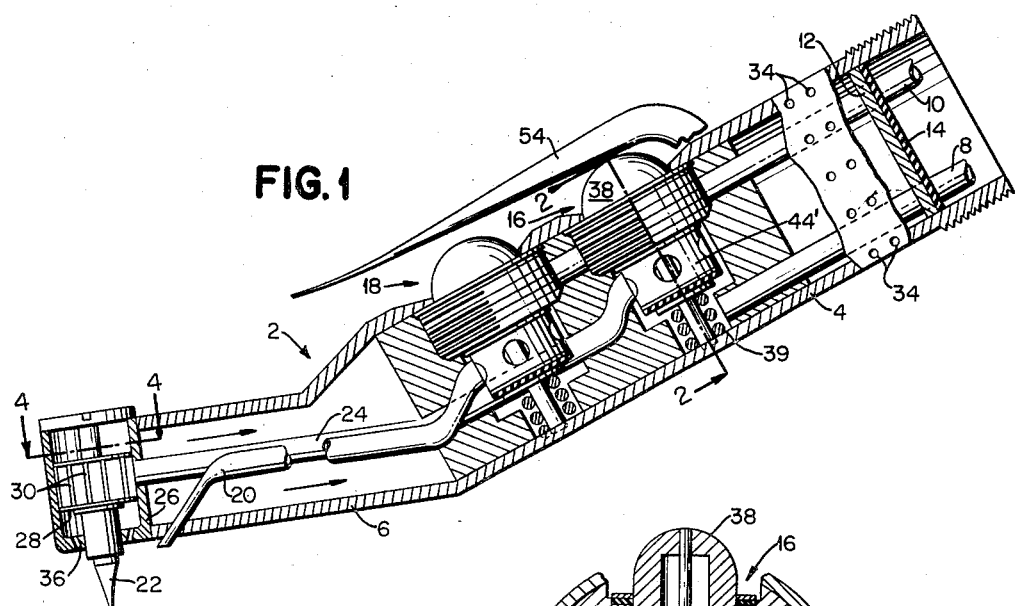
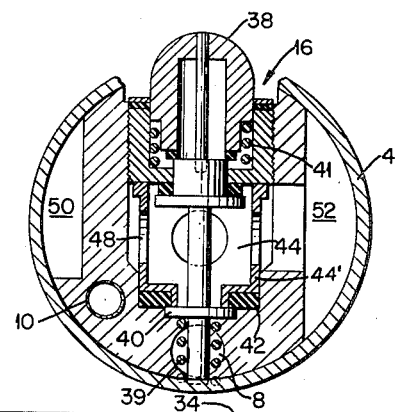
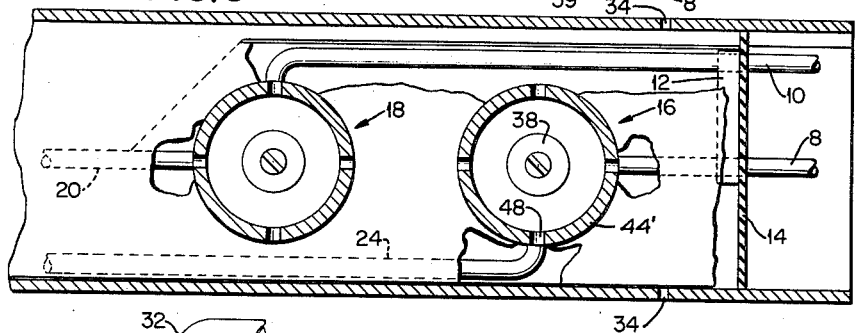
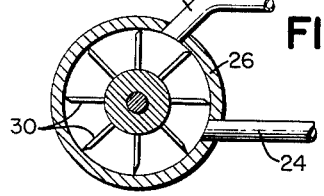
INVENTORS
MURRAY J. FLETCHER
JULIUS SOBSEY
BY *George Brown*
ATTORNEY United States Patent Office 2,866,267
Patented Dec. 30, 1958

2,866,267
DENTAL HAND DRILL
Murray J. Fletcher and Julius Sobsey, Kingston, N. Y.
Application February 10, 1958, Serial No. 714,126
6 Claims. (Cl. 32—28)

This invention relates to dental hand drills in general, and more particularly, to high speed air-driven dental drills.

High speed air-driven dental drills are capable of providing speeds between 100,000 R. P. M. to above 200,000 R. P. M., such high speeds being applied to a dental burr. These high speeds apply a high torque to the dental burr, such torque being more than sufficient to sustain an even and uniform cutting of a tooth by such rapidly rotating burr. A turbine rotor, having a plurality of blades attached thereto, is actuated by compressed air of variable pressures so as to provide the required driving force to such rotor. For convenience, a finger-controlled lever may be employed near the hand-piece normally gripped by the dentist so that a valve may be actuated during operation of the drill, the amount of valve opening determining the pressure being urged against the rotor blades, hence the speed of rotation of the turbine rotor. Such finger-controlled valves for a fluid-driven dental tool have been known as far back as 1904, as evidenced by the Clarke Patent No. 751,261.

It is also desirable to apply a cooling medium, such as water, onto the surface of the tooth being drilled, since the cutting of the tooth by the drill creates a heating of the tooth, such heat being sensed as "thermal shock" by the nervous system of the patient. Means for applying such cooling medium are also well-known. However, such cooling means are normally employed as auxiliary elements attached to the outer surface of the handpiece. Not only are these auxiliary cooling means bulky, but they also require valves or means to control the flow of cooling fluid. The valve for controlling the cooling fluid is distinct from the valve employed to control the flow of air to the turbine rotor. Consequently the dentist is obliged to operate the cooling fluid and air-driven rotor separately. The bulkiness of the auxiliary cooling means as well as the inconvenience of having to actuate at least two separate valves, often located remotely from each other, reduces the efficiency of the dentist's drilling of his patient's tooth.

The aforementioned difficulties are overcome by employing two valves located in the dental hand-piece near the portion of the tool gripped by the dentist during normal use of said tool. Located above said valves and in a manner hereinafter to be more fully described is a finger-controlled lever which permits the dentist to actuate one or both valves, the actuation of one valve permitting air or suitable motive fluid to drive a rotor turbine, whereas the actuation of both valves simultaneously will permit both air and cooling liquid to flow toward the front of the hand-piece.

Furthermore, this invention includes means wherein the motive fluid for driving the rotor turbine and the liquid coolant for maintaining a tooth being drilled at a low temperature are both contained within the walls of the casing or housing of the dental hand-piece, providing a neat and light dental hand-piece. Additional to the novel features mentioned hereinabove is the reliance upon a chamber within the housing of the dental handpiece for returning the spent air or motive fluid of the turbine rotor, such chamber isolating the exhausted air from the incoming driving motive fluid. Such separation of exhaust motive fluid from incoming motive fluid avoids the buildup of undesired back pressure, such undesired back pressure resulting in a slowing down of the turbine rotor to the point where the dental drill will not perform as desired.

Consequently, it is an object of this invention to provide a novel dental hand-piece in which one may have finger-control of air or water, or both, in a dental hand-piece tool without interfering with the normal function of said dental tool.

It is a further object to provide a more compact dental hand-piece capable of supplying air and water to operating elements of said hand-piece.

It is yet another object to accomplish the aforementioned objects without increasing the overall size of said hand-piece nor diminish its speed of operation.

The foregoing and other objects will become apparent as the description proceeds. The invention resides in the combination and arrangement of parts and in the details of construction hereinafter described and claimed. It is understood that changes in the precise embodiment of the invention may be made within the scope of what is claimed without departing from the spirit of the invention.

Fig. 1 is an axial section of that part of the dental engine sufficient to show the invention.

Fig. 2 is a cross-section of one of the valves used in the embodiment of the invention shown in Fig. 1 and taken along the line 2—2 of Fig. 1.

Fig. 3 is a top-view of Fig. 1 with certain portions of Fig. 1 omitted for purposes of simplifying the illustration of the invention.

Fig. 4 is a view taken along 4—4 of Fig. 1.

Turning to Fig. 1, there is shown a dental hand-piece 2 having a housing or casing 4 whose forward portion 6 is illustrated as being disposed at an angle to the main body of casing 4 in order to permit ease of drilling of teeth, but such change in casing geometry is optional. Conduit 8 is adapted to be attached to a conventional supply of air (not shown) or other motive fluid under pressure whereas conduit 10 is adapted to be attached to a conventional supply (not shown) of water or other coolant. The casing 4 may be threaded as shown or may be otherwise fitted with snap-on means or well-known adaptors for accommodating the air and water supply means not shown. Included in housing 4 is a wall 12 and bushing or washer 14. Said wall not only serves to support the conduits 8 and 10, but it also separates the fluids entry portion from the fluids exit portion of the hand-piece.

Air conduit 8 enters valve 16 near its base and any air under pressure in such conduit is stopped from proceeding forward unless valve 16 is actuated. In a similar manner, water conduit 10, which by-passes valve 16, as best seen in Fig. 3, is stopped from proceeding forward unless valve 18 is actuated. When valve 18 is actuated, water flowing in conduit 10 passes through valve 18, leaving the latter to flow through outlet 20 onto drill 22. The tube 24 is the conduit through which air under pressure leaves valve 16 when the latter is opened, such tube 24 terminating in a confined head 26. Inside the head 26 is a turbine rotor 28 having blades 30, the latter being disposed so that the air exiting from conduit 24 impinges upon that blade closest to such conduit 24 so as to impart rotary motion to turbine rotor 28. The turbine rotor 28 is mounted on suitable bearings in said housing 26. The spent air leaves through air exhaust passageway 32 and travels rearwardly through the hollow body of the dental hand-piece, circumventing valves 18 and 16 and exiting through apertures 34 circumferentially disposed about the casing 4, away from the working area close to the patient's mouth. Minute holes 36 are also shown in head 26 for allowing air to seep out during operation of the turbine rotor 28; such holes 36 are believed to provide smoother operation of the rotor at high speeds. However such holes 36 may be dispensed with in the actual construction of workable device.

Water valve 18 is similar to air valve 16 so the description of the operation of valve 16 will suffice for both. As is seen in Fig. 2, the valve button or stem 38 protrudes above the level of casing 4. Shoulder 40 abuts against bushing 42 in its normally closed position, preventing air in conduit 8 from entering chamber 42. When button 38 is depressed to overcome the restraining force of springs 39 and 41, shoulder 40 is urged away from its closure position, permitting air to enter chamber 44. A ring 44' having apertures 48 therein permits air to escape therethrough. One of such apertures 46 coacts with air entering through conduit 8 and another aperture coacts with passage 24 to permit air to travel toward the turbine rotor 28. The spent air returns rearwardly within the dental hand-piece through passageways 50 and 52 in the body of the casing. Thus the forward going air is not impeded by the rearward flowing spent air, since the two travel along independent, confined paths. Finger-controlled lever 54 is secured to the outer periphery of casing 4 by means of screws or other suitable means and such lever is springlike in character so that it will return to the position shown in Fig. 1 when pressure is removed therefrom.

Operation of the dental hand-piece will now be apparent. The dental hand-piece is attached so that pressurized air or other suitable motive fluid is made to flow into conduit 8 and a coolant such as water is made to flow into conduit 10. The dentist gradually applies pressure to the lever 54, and the angle that lever 54 makes with the buttons 38 of valves 16 and 18 is such that he can actuate valve 16 without actuating valve 18 so as to operate only the rotor turbine 28. If the dentist also wishes to supply the coolant fluid to the area of the tooth being drilled, he applies more pressure to lever 54, permitting valve 18 to be opened so that coolant material can be made to flow through valve 18 and then through passageway 20. Pressure can be removed from lever 54 so that only valve 16 is now actuated, cutting off the supply of coolant but permitting the dentist to continue his drilling operation.

It is to be understood that wide variations in the valve structure can be tolerated without departing from the spirit of the invention so long as such valves are operable by a finger-controlled lever situated on the hand-piece near the area where it is natural and normal for the dentist to grip such hand-piece while using the latter for its intended purpose.

From the above description of the device it is seen that a completely self-contained dental hand-piece is provided for simultaneously providing air to a rotor turbine of a dental drill and a supply of coolant substance to said drill, the passageways for transmitting such air and coolant being entirely within the housing of a conventional dental hand-piece. The former feature is a saving in space and avoids the bulkiness that was inherent in previous hand-pieces that attempted to do both. Moreover, the finger-controlled lever for manipulating valves that will permit only the flow of air or the flow of both air and water without interfering with the drilling operation is of considerable advantage in adding to the comfort of the dentist as well as to the patient during the drilling or similar operation. Finally, the manner of ejecting the spent air is such as to avoid any interference with the air driving the rotor turbine.

It is understood that the invention is not limited to the particular size, shape, number or arrangement of parts as shown and described, all of which may be varied without going beyond the scope of the invention as shown, described and claimed.

What is claimed is:

1. In a dental hand-piece the combination of a casing for housing a fluid-driven rotor turbine at one end of said casing, a tool adapted to be driven by said turbine, a first means for supplying fluid to said turbine and a second means for supplying a coolant for said tool, said first and second means being supplied through the other end of said casing, control means located on said casing and intermediate said two ends and adapted to modify said first and second means, and a finger-controlled lever situated adjacent said control means for actuating said control means.

2. The dental hand-piece as defined in claim 1 wherein said first and second means are enclosed within said casing.

3. In a dental hand-piece the combination of a casing for housing an air-driven rotor turbine at one end of said casing, a tool adapted to be driven by said turbine, a first means for supplying air under pressure to said turbine and a second means for supplying a coolant for said tool, a first valve for controlling the flow of air from said first means to said rotor turbine, a second valve for controlling the flow of coolant to said tool, both valves being located intermediate the ends of said casing, a finger-controlled lever situated on said casing and being located near said valves so as to permit actuation of said air valve independently of said coolant valve as well as simultaneous actuation of both valves.

4. In a hand-piece for a dental engine, the combination of a casing, a turbine rotor adapted to drive a dental tool situated in the forward portion of said casing, said casing housing a first connection for the supply of compressed air to said turbine and a second connection for the supply of a coolant to said tool, both connections being disposed at the other end of said casing, two valves situated intermediate said rotor turbine and said first and second connections, one valve being adapted to control the flow of compressed air toward the turbine rotor and the second adapted to control the flow of said coolant, each valve having a stem protruding through said casing to the exterior thereof, and a finger-controlled lever fulcrumed on the outside of said casing and adapted to be urged against said stems so that gradual pressure applied to said lever will actuate one or both stems.

5. In a dental hand-piece the combination of a casing for housing a fluid-driven rotor turbine at one end of said casing, a tool adapted to be driven by said turbine, a first means for supplying motive fluid to said turbine and a second means for supplying a coolant for said tool, said first and second means being supplied through the other end of said casing, control means located on said casing and intermediate said two ends and adapted to modify said first and second means, a finger-controlled lever situated adjacent said control means for actuating the latter, and means for eliminating said spent fluid after it has been supplied to said rotor turbine so as not to interfere with said fluid supplying means.

6. In a dental hand-piece the combination of a casing for housing a fluid-driven rotor turbine at one end of said casing, a tool adapted to be driven by said turbine, a first means for supplying motive fluid to said turbine and a second means for supplying a coolant to said tool, said first and second supply means being located at the other end of said casing and being confined within said casing, a first control means for said motive fluid located intermediate said two ends, a second control means for said coolant located adjacent said first control means, a finger-controlled lever secured to said casing and adapted to actuate said first and second control means during normal use of said dental hand-piece, whereby slight pressure on said lever will gradually actuate only said first control means and increasing pressure will actuate both control means, and the removal of pressure will cause neither control means to be actuated.

References Cited in the file of this patent
UNITED STATES PATENTS

| 1,000,785 | Cunningham et al. | Aug. 15, 1911 |
| 2,420,338 | Page | May 13, 1947 |
| 2,681,408 | Bronk | June 15, 1954 |